Patented July 11, 1944

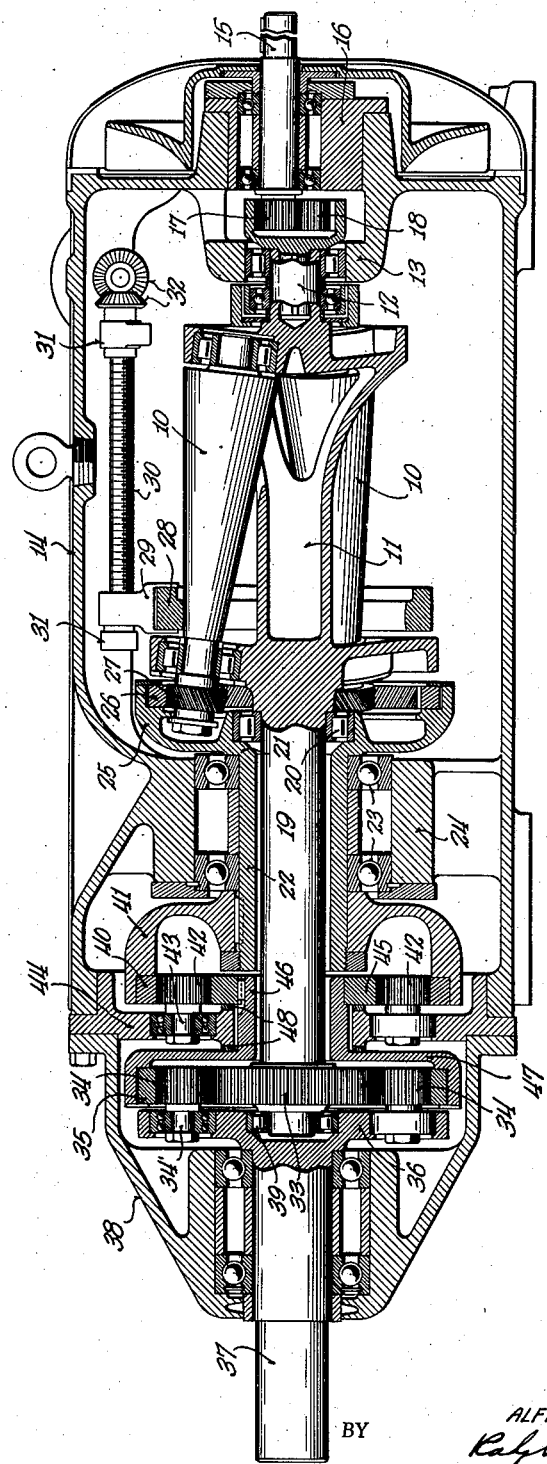

2,353,136

UNITED STATES PATENT OFFICE 2,353,136

VARIABLE SPEED TRANSMISSION

Alfred G. Bade, Wauwatosa, Wis., assignor to The Falk Corporation, Milwaukee, Wis., a corporation of Wisconsin Application February 10, 1941, Serial No. 378,163

8 Claims. (Cl. 74—284)

This invention relates to variable speed transmissions.

The prior patent to Walter P. Schmitter, No. 2,168,274, discloses a type of variable speed transmission in which the rate and direction of rotation of a driven member is determined by the planetary action of a plurality of inclined tapered planet rollers, and in which the planetary action of the rollers is regulated and controlled by a circular control element frictionally engaged with the rollers and adjustable lengthwise thereof. The transmission shown in said patent operates efficiently and provides a stepless variation in driven speeds throughout a speed range including a zero speed.

An object of the present invention is to provide a variable speed transmission of increased load capacity in which a transmission of the type mentioned is utilized to effect a stepless speed variation without subjecting the latter to more than a fractional part of the total transmitted load.

Other more specific objects and advantages will appear from the following description of a variable speed transmission constructed in accordance with the present invention.

The single figure of the accompanying drawing is a longitudinal sectional view of a variable speed transmission embodying the present invention.

The transmission selected for illustration includes a variable speed transmission substantially like that disclosed in the patent above identified and comprising three longitudinally tapered inclined planet rollers 10 journalled in the end heads of an appropriate rotor 11. The rotor 11 is supported at one end by a stub shaft 12 journalled in an inner bearing block 13 rigidly mounted on the end wall of a horizontally split housing 14. A drive shaft 15, journalled in an external end hub 16 of the housing, is suitably geared to the rotor by a pinion 17 on the drive shaft which meshes with an internal gear 18 on the rotor shaft 12. The other end of the rotor is supported by a shaft 19 journalled in a bearing 20 seated within the flanged end 21 of a hollow shaft 22, which in turn is journalled in appropriate bearings 23 fixed in an appropriate block 24 rigidly mounted within the housing.

A head 25, rotatable with and supported by the hollow shaft 22, carries a ring gear 26 which surrounds and meshes with planet pinions 27 fixed to the adjacent ends of the respective rollers 10, so that rotation of the shaft 22 is determined by the planetary action of the rollers. The rollers of course revolve with the rotor 11 about the longitudinal axis of the latter and also rotate about their individual axes, this dual planetary motion being controlled by a non-rotating ring 28 encircling the rollers 10 and frictionally engaged therewith.

The ring 28 is shiftable along the rollers by appropriate means, such as a fork 29, which embraces the ring at one point of its periphery and which is supported and actuated by a screw rod 30 in threaded engagement therewith, the rod being journalled in appropriate stationary brackets 31 in the housing and being rotated and controlled from a point externally of the housing through appropriate gearing 32. Appropriate means for holding the ring against rotating and also for pressing the rollers outwardly against the ring, as well as the ring shifting mechanism just referred to, are fully disclosed in the patent above identified. It will suffice here to note that by virtue of the tapered form of the rollers their planetary action is varied by adjustment of the ring along the rollers, with the result that a stepless variation in the rate of rotation of the hollow shaft 22 is thereby obtained.

The transmission shown also includes a planetary gear train including a sun gear 33, three planet pinions 34 meshing therewith, and an orbit gear 35 meshing with the planet pinions. In this instance the sun gear 33 is fixed to the projecting end of the rotor shaft 19 for rotation therewith, and each of the planet pinions 34 is carried by a stub shaft 34' journalled in a disk 36 carried by a driven shaft 37. The driven shaft is journalled in an end extension 38 of the housing 14 and is hollowed out to receive a bearing 39 which provides additional support for the shaft 19. The orbit gear 35 is operatively connected to the hollow shaft 22 by appropriate means preferably such as will now be described.

For this purpose a ring gear 40 is provided, carried by an appropriate head 41 keyed or otherwise fixed to the tubular shaft 22. The gear 40 meshes with three pinions 42, each supported by a stub shaft 43 journalled in a stationary partition plate 44 securely anchored between the main housing 14 and the end housing 38. The several pinions 42 mesh with a central gear 45 keyed or otherwise fixed to the tubular hub 46 of a disk 47 on which the orbit gear 35 is carried. The hub 46 extends loosely through a central opening in the plate 44 and loosely surrounds the shaft 19 so that it is free to move radially. The hub 46, disk 47, and gears 45 and 35 thus constitute a rigid unit free to float radially in a manner to equalize the operating pressures between the several pinions 34 and gear 35 and between the several pinions 42 and gear 45. This floating unit is constrained against tilting by guide rings 48 carried by the plate 44 and bearing against the sides of the disk 47 and the gear 45. It will be noted that the gear train just described provides an operating connection through which the gear 35 is driven from the tubular shaft 22 at a higher rate and in a direction opposite to that of the shaft 22.

From the foregoing description it will of course be understood that the rate and direction of rotation of the driven shaft 37 is determined by the relative motions of the orbit gear 35 and sun gear 33, the rate of rotation of the latter being constant, in the sense that it always bears a definite relation to the normally constant speed drive shaft 15, and the rate and direction of rotation of the orbit gear 35 being determined by the position of the control ring 28 with respect to the rollers 10. If the control ring 28 is so set that the peripheral velocity of the gear 35 is equal and opposite to that of gear 33, the speed of rotation of the driven shaft is of course zero; if so set that the peripheral speed of gear 35 is greater and opposite to that of gear 33, the driven shaft of course rotates in the direction of rotation of gear 35 and at a rate dependent upon the difference in the peripheral velocities of the gears 35 and 33; and if so set that the peripheral speed of gear 35 is less and opposite that of gear 33, the driven shaft of course rotates in the direction of rotation of gear 33 and at a rate dependent upon the difference in the peripheral velocities of the gears 35 and 33. With the ring 28 so set as to reduce the speed of gear 35 to zero, the driven shaft then rotates in the direction of rotation of the gear 33 and at about one half the angular velocity thereof; and the speed of the driven shaft is further increased as the ring 28 is shifted to reverse the direction of rotation of the gear 35.

It will be further noted that under all conditions of operation a major part of the total load is transmitted through positive mechanical connections from the drive shaft 15 to and through the gear 33 quite independently of the rollers 10, and that the remaining minor portion of the load is transmitted from the drive shaft through the planet pinions 21, as a result of the frictional reactions of the rollers 10 against the ring 28, and through the gears 26 and 35 and the connections therebetween.

Since the load capacity of a transmission of the type disclosed in the patent above identified is limited by the amount of frictional drag available between the planet rollers and control ring, and since in the transmission herein shown a major portion of the load is transmitted through positive driving connections, the load capacity of the latter is considerably greater than that of said patent and yet the desirable operating characteristics, including the stepless speed variation throughout a speed range including zero speed, have been retained. With the arrangement and proportion of parts herein disclosed only about twenty per cent of the total load is transmitted through the friction sustained part of the transmission, so that the total load capacity of the transmission shown is five times that of the type of transmission shown in said patent.

Various changes may be made in the embodiment of the invention as hereinabove specifically described without departing from or sacrificing the advantages of the invention as defined in the appended claims.

I claim:

1. In a variable speed transmission the combination of a driver, a plurality of planet members driven thereby, a control element frictionally engaged with said planet members, a planetary system including three coaxial rotors, one of said rotors comprising a planet member engaged with both of said other rotors, a driven member operatively connected with one of said rotors, means providing a driving connection between said driver and another of said rotors, means rendering the third of said rotors responsive to the planetary action of said first named planet members, and means for effecting relative adjustment between said control element and said first named planet members to vary the planetary action of the latter and thereby regulate the rate of operation of said driven member.

2. In a variable speed transmission the combination of driving and driven members, a plurality of planet members, a control ring frictionally engaged with said planet members, means for effecting relative adjustment between said ring and said planet members to regulate the planetary action of the latter, operating connections through which a portion of the torque load received from said driving member is transmitted through said planet members to said driven member, and operating connections through which the remainder of the torque load received from said driving member is transmitted to said driven member independently of said planet members.

3. In a variable speed transmission the combination of a housing, driving and driven shafts at opposite ends of said housing, a plurality of planet members within said housing, a control element frictionally engaged with said planet members and adjustable to regulate the planetary action thereof, operating connections within said housing for transmitting a portion of the torque load from said drive shaft to said driven shaft through said planet members, and operating connections within said housing for transmitting the remaining portion of the torque load from said drive shaft to said driven shaft independently of said planet members.

4. In a variable speed transmission the combination of a driver, a plurality of planet members driven thereby, a control member frictionally engaged with said planet members and adjustable to vary the planetary motion thereof, a driven member, a planetary gear train including two coaxial gears and a plurality of planet gears engaged with both of said coaxial gears, an operating connection through which said driven member is rotated in response to the planetary action of said planet gears, an operating connection through which one of said coaxial gears is rotated in response to rotation of said driver, and an operating connection through which the other of said coaxial gears is rotated in response to the planetary action of said first named planet members.

5. In a variable speed transmission the combination of a driver, a plurality of inclined tapered planet rollers driven thereby, a control ring frictionally engaged with said rollers and adjustable lengthwise thereof to regulate their planetary action, a driven member, and a planetary gear system including a plurality of planet gears connected to rotate with said driven member, a gear meshing with said planet gears and driven by said driver independently of said planet rollers, and a second gear meshing with said planet gears and rotatable in response to the planetary action of said planet rollers.

6. In a variable speed transmission the combination of a driver, a plurality of inclined tapered planet rollers driven thereby, a control ring frictionally engaged with said rollers and adjustable lengthwise thereof to regulate their planetary action, a rotor geared to said planet rollers, a driven member, a plurality of planet gears rotatable with said driven member, a gear meshing with said planet gears, a positive driving connection between said driver and said last named gear, a second gear meshing with said planet gears, and operating connections through which said second gear is caused to rotate at a speed higher than said rotor.

7. In a variable speed transmission the combination of a driver, a plurality of inclined tapered planet rollers driven thereby, a control ring frictionally engaged with said rollers and adjustable lengthwise thereof to regulate their planetary action, a rotor geared to said planet rollers, a driven member, a plurality of planet gears rotatable with said driven member, a gear meshing with said planet gears, a positive driving connection between said driver and said last named gear, a second gear meshing with said planet gears, and means connected with said rotor for effecting operation of said second gear at a speed higher and opposite to that of said rotor.

8. In a variable speed transmission the combination of a driver, a plurality of inclined tapered planet rollers driven thereby, a control ring frictionally engaged with said rollers and adjustable lengthwise thereof to regulate their planetary action, a rotor geared to said planet rollers, a driven member, a plurality of planet gears rotatable with said driven member, a gear meshing with said planet gears, a positive driving connection between said driver and said last named gear, a second gear meshing with said planet gears, and means connected with said rotor for effecting operation of said second gear in a direction opposite to that of said rotor.

ALFRED G. BADE.